Feb. 22, 1944.   R. F. SNYDER   2,342,605
VIBRATION TESTING APPARATUS
Filed April 18, 1942

Inventor
Robert F. Snyder
By
Attorney

Patented Feb. 22, 1944

2,342,605

UNITED STATES PATENT OFFICE 2,342,605

VIBRATION TESTING APPARATUS

Robert F. Snyder, Lakemore, Ohio, assignor to Wingfoot Corporation, Akron, Ohio, a corporation of Delaware Application April 18, 1942, Serial No. 439,485

4 Claims. (Cl. 73—51)

This invention relates to testing apparatus for determining movements, vibrations, and the like of various objects under actual or controlled operating conditions, and, more specifically, is concerned with apparatus for testing for and determining centrifugal movement, vibrations, chatter, and the like of V-belts, flat belts, or other load transmitting means.

It is the general object of my invention to provide improved apparatus of portable, light weight, relatively inexpensive, easily-operated, simple and rugged character, which may be readily associated and adjusted to a moving or vibrating object to determine the extent and type of the movement or vibrations of the object.

Another object of my invention is the provision of a unitary frame apparatus which can be positioned around the unsupported travel of a belt, or the like, and which will give an accurate indication of the movement or vibrations of the belt during actual or controlled operating conditions.

Another object of my invention is to provide apparatus for indicating the movement or vibrations of an object by the use of photo-electric and associated indicating means and a light source for throwing at least a part of the shadow of the object being tested against the photo-electric means.

The foregoing and other objects of my invention are achieved by the provision of testing apparatus including a light source for throwing a beam of light against the object being tested, photo-electric means being positioned so that at least part of the shadow of the object and at least a part of the light beam strikes the photo-electric means, means for adjustably shielding the photo-electric means so as to expose only the desired portion thereof, and means associated with the photo-electric means for indicating movement of the object.

For a better understanding of my invention reference should be had to the accompanying drawing wherein Fig. 1 is a side elevation, with portions of the cover being broken away, of a typical embodiment of the apparatus of my invention;

Figures 1, 2:
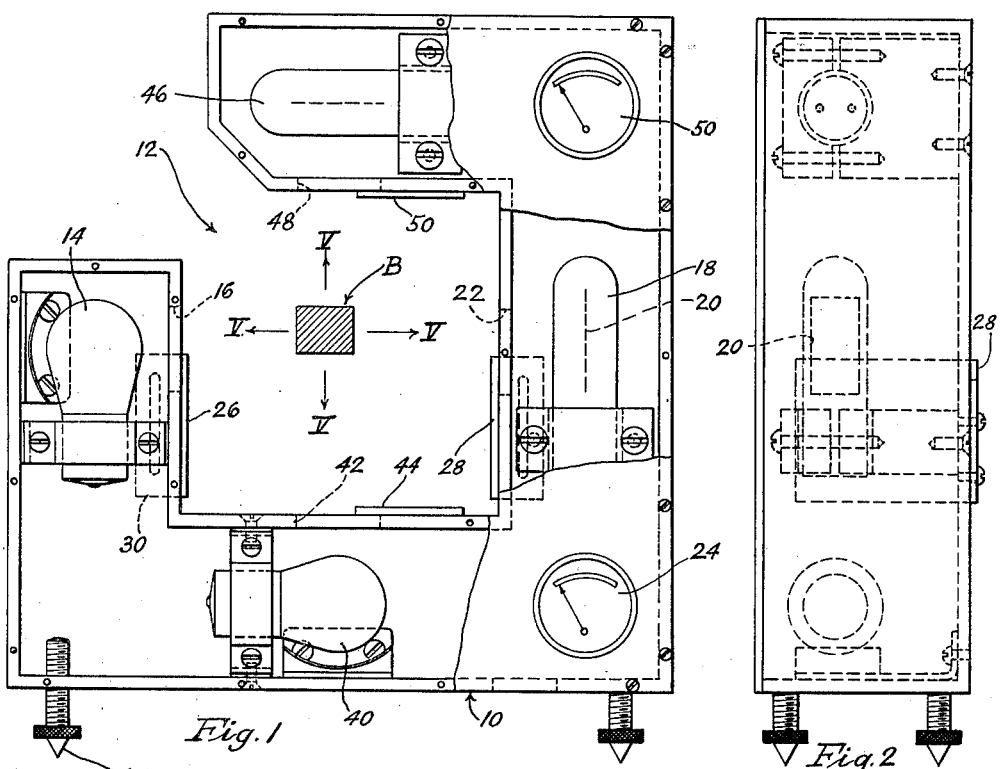
Fig. 2 is an end view of the apparatus illustrated in Fig. 1.
Figure 3:
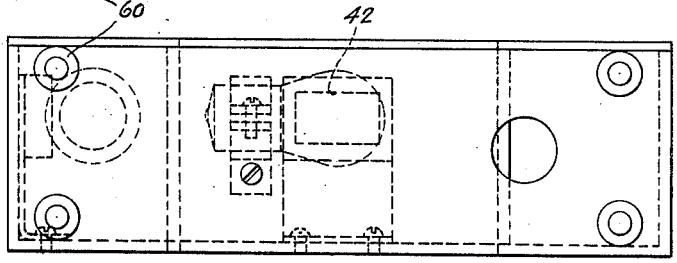
Fig. 3 is a bottom plan view of the apparatus shown in Fig. 1.
Figure 5:
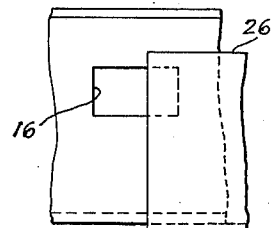
Fig. 5 is an elevation of a portion of the apparatus taken substantially in the direction shown by the horizontal arrows V in Fig. 1.
Figure 4:
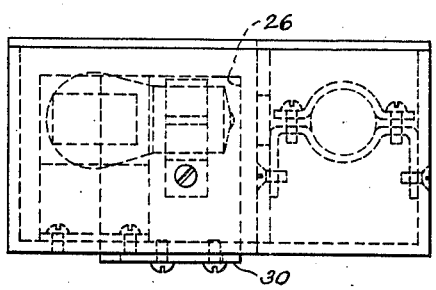
Fig. 4 is an end elevation of the left end of the apparatus shown in Fig. 1 with the elevation being laid over on its side.

Although the principles of my invention are broadly applicable to the testing of substantially any of a wide variety of moving or vibrating objects, my invention is particularly adapted to the testing of travelling belts for centrifugal throw, vibrations, and chatter, and, accordingly, I have illustrated my invention in conjunction with the testing of belts and will so describe it.

Having reference to the drawing, the numeral 10 indicates generally a hollow frame adapted to surround the object being tested, for example, the travel of a belt B. To this end, the frame 10 is conveniently made of a square or rectangular shape and with an opening 12 so that the frame can be readily slipped over and around the belt B during a testing operation.

The frame 10 carries a light source 14 adapted to throw a beam of light through a window or opening 16 in the frame and against the side of the belt B. Positioned opposite to the light source 14 and inside of the frame 10 is a photo-electric cell pick-up means, which has its light sensitive element 20 positioned opposite a window 22 formed in the side of the frame 10 adjacent the belt B. The photo-electric means 18 is adapted to be connected, with or without amplification, to any suitable indicating or recording means of known character and in known manner, and one embodiment of such means has been conveniently indicated in the drawing as including a galvanometer 24 mounted in the cover plate of the frame 10. However, it should be understood that the actual indicating or recording means of the apparatus may be incorporated in a separate unit and connected to the output of the photo-electric means 18 by connecting wires.

One of the features of my invention is to control the character and extent of the pick-up characteristics of the photo-electric means 18. This is conveniently accomplished by providing the windows 16 and 22 with adjustable cover means, such as are indicated respectively by the numerals 26 and 28. The cover means 26 and 28 can be adjustably supported on the frame 10 in any desired manner, for example, by the provision of a slotted bracket 30 having an associated screw extending therethrough into the frame. The position of the cover means may be calibrated, if desired, and thumb screw means used to move the cover means.

In any event, the object of the covers 26 and 28 is to so control the flow of light beams from the light source 14 to the photo-electric means 18 that the shadow of the belt B may exactly cover the window 22 so that any movement of the belt B either upwardly or downwardly will cause a portion of the light beam uncovered by the movement of the belt to strike the photo-electric means 18. Again, I may arrange the position of the belt B and the covers 26 and 28 so that at least a part, or only a portion of the shadow of the belt B will strike the photo-electric means 18, or I may arrange the covers 26 and 28 and the belt B so that a part of the shadow of the belt B and a part of the light beams will strike the photo-electric means 18.

Means similar to those just described are incorporated in the apparatus so as to determine the movement or vibrations of the belt in a direction at right angles to those determined by the means already mentioned. For this purpose, a suitable light source 40 is incorporated in the base of the apparatus to direct a light beam through a window 42 adjustably closed by one or more cover means 44. Positioned opposite to the light source 40 is a photo-electric cell pick-up means 46 which receives the light beams through a window 48 adjustably closed by one or more cover means 50. The photo-electric means 46 is adapted to be connected to any suitable indicating means, such as the galvanometer 50 carried by the frame 10. Of course, the indicating means 50 may take the form of a separate unit not mounted on the frame 10, if this be desired. The position of the belt B with respect to the windows 42 and 48 can take any one of the several alternatives already described in conjunction with the windows 16 and 22.

In the use of my apparatus the frame 10 may be positioned around the belt B while the belt is at rest and in any one of the several manners already described. The operation of the belt thereafter with the attendant vibration, chatter, or centrifugal movement of the belt will cause a direct reading on the galvanometers 24 and 50 of the action of the belt during actual operating or controlled operating conditions. Various belt constructions, operating speeds, loads, and the like can be tested for and a direct relation of the various factors can be determined from the indicating means.

Again, I may adjust the belt B with respect to the apparatus while the belt is under normal, no-load, or other operating conditions, and then may test for a change in the movement, chatter, vibration of the belt due to a controlled or known change in the operating conditions of the belt.

From the foregoing it will be recognized that the various objects of my invention have been achieved by the provisions of a relatively simple, practical, inexpensive, easily operated, light weight apparatus which can be quickly associated with a belt, or the like to test for known, controlled, or varying operating conditions of the belt. Flat transmission belts, V-transmission belts, or other forms of power transmitting means can be readily tested, as can a wide variety of other objects which are subjected to movement or vibration under operating conditions. The apparatus may include adjustable screw legs 60 or other supporting means so as to control the vertical height of the frame with respect to the belt, or this can be compensated for by the adjustment of the covers 26 and 28, or by other covers associated with the windows 16 and 22. Further, I may incorporate with the indicating means, recording means of known character to show in graphical or other form the respective characteristics of the belt or other object being tested.

While in accordance with the patent statutes I have specifically illustrated and described my advance in the art, it should be particularly understood that I am not to be limited thereto or thereby, but that the scope of my invention is defined in the appended claims.

I claim:

1. Testing apparatus for belts and the like comprising a frame adapted to surround the travel of a belt, a light source carried by the frame for throwing a beam of light perpendicular to a face of the belt, photo-electric means carried by the frame opposite the light beam, shield means adjustably covering the photo-electric means so that the opening into the photo-electric means is substantially equal to the width of the shadow thrown by the belt, a second light source carried by the frame and throwing a beam of light at right angles to a perpendicular to the face of the belt, a second photo-electric means carried by the frame opposite the second light source, shield means adjustably covering the second photo-electric means so that the opening into the photo-electric means is substantially equal to the shadow thrown by the thickness of the belt, and means responsive to both photo-electric means for indicating the lateral and radial movement of the belt during operation.

2. Vibration testing apparatus for belts and the like comprising a frame adapted to surround the travel of a belt, a light source carried by the frame for throwing a beam of light perpendicular to a face of the belt, adjustable means to confine the width of the light beam to the width of the belt, photo-electric means carried by the frame opposite the light beam, shield means adjustably covering the photo-electric means so that the opening into the photo-electric means is substantially equal to the width of the shadow thrown by the belt, and means responsive to the photo-electric means for indicating the vibration of the belt during operation.

3. Testing apparatus for belts and the like comprising a frame adapted to surround the travel of a belt, a light source carried by the frame for throwing a beam of light perpendicular to a face of the belt, photo-electric means carried by the frame opposite the light beam, shield means adjustably covering the photo-electric means so that the opening into the photo-electric means is substantially equal to the width of the shadow thrown by the belt, and means responsive to the photo-electric means for indicating the lateral movement of the belt during operation.

4. Testing apparatus for moving objects including a light source for throwing a beam of light against the object, photo-electric means positioned so that at least part of the shadow of the object and at least a part of the light beam strikes the photo-electric means, means for adjustably shielding the photo-electric means so as to expose only the desired portion thereof, and means associated with the photo-electric means for indicating movement of the object.

ROBERT F. SNYDER.